US012617295B2

(12) United States Patent
Schnappauf

(10) Patent No.: US 12,617,295 B2
(45) Date of Patent: May 5, 2026

(54) DRIVE CONTROL SYSTEM FOR A MOTOR VEHICLE OPERABLE BY ELECTRIC MOTOR AND HAVING A GEAR SELECTOR

(71) Applicant: Bayerische Motoren Werke Aktiengesellschaft, Petuelring (DE)

(72) Inventor: Florian Schnappauf, Hattenhofen (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 215 days.

(21) Appl. No.: 18/270,960

(22) PCT Filed: Feb. 10, 2022

(86) PCT No.: PCT/EP2022/053185
§ 371 (c)(1),
(2) Date: Jul. 5, 2023

(87) PCT Pub. No.: WO2022/184397
PCT Pub. Date: Sep. 9, 2022

(65) Prior Publication Data
US 2024/0059159 A1 Feb. 22, 2024

(30) Foreign Application Priority Data

Mar. 5, 2021 (DE) ..................... 10 2021 105 340.4

(51) Int. Cl.
*B60L 15/20* (2006.01)
*F16H 59/08* (2006.01)

(52) U.S. Cl.
CPC .......... *B60L 15/2063* (2013.01); *F16H 59/08* (2013.01); *B60L 2240/10* (2013.01); *B60L 2250/28* (2013.01)

(58) Field of Classification Search
CPC ............. B60L 15/2063; B60L 2240/10; B60L 2250/28; B60L 50/60; F16H 59/08; B60W 30/18063
See application file for complete search history.

(56) References Cited

U.S. PATENT DOCUMENTS 6,053,581 A     4/2000  Siepker
8,475,331 B2 *  7/2013  Kaltenbach .............. B60K 6/48
                                            180/65.265

(Continued)

FOREIGN PATENT DOCUMENTS

CN        111942170 A      11/2020
DE   10 2009 037 182 A1     2/2011

(Continued)

OTHER PUBLICATIONS

"Kubaisi, M; Adaptive Regenerative Braking in Electric Vehicles; Jan. 12, 2018" (Year: 2018).*

(Continued)

*Primary Examiner* — Ramya P Burgess
*Assistant Examiner* — Christopher R Cardimino
(74) *Attorney, Agent, or Firm* — Crowell & Moring LLP

(57) ABSTRACT

A drive control system for a motor vehicle able to be operated by an electric motor and having a drive stage selector, an electronic accelerator pedal, a brake pedal, and an electronic control unit that is configured such that a creep function is deactivated when a first alternative automatic drive stage is selected, and that a creep function is activated when a second alternative automatic drive stage is selected. The control unit furthermore contains an appropriately programmed function module by way of which, when the creep function is activated and based on creep pilot control, the creep moment predefined thereby, in the form of a drive moment, is reduced based on a braking request from the driver, wherein a frictional braking moment is activated by (Continued)

the conventional wheel brake system only when the minimum possible creep moment is reached.

11 Claims, 4 Drawing Sheets

(56) References Cited

U.S. PATENT DOCUMENTS

| | | | | |
|---|---|---|---|---|
| 8,718,913 | B2 * | 5/2014 | Crombez | G07C 5/0825 |
| | | | | 340/439 |
| 8,958,944 | B2 * | 2/2015 | Jung | B60W 30/18063 |
| | | | | 477/92 |
| 12,275,389 | B2 * | 4/2025 | Eberl | B60T 1/10 |
| 2012/0231926 | A1 * | 9/2012 | Erbguth | B60L 7/12 |
| | | | | 477/93 |
| 2013/0041534 | A1 * | 2/2013 | Kim | B60W 20/10 |
| | | | | 903/902 |
| 2013/0288855 | A1 | 10/2013 | Monsere | |
| 2018/0170386 | A1 * | 6/2018 | Jung | B60W 30/18063 |
| 2018/0264973 | A1 | 9/2018 | Mochizuki et al. | |
| 2018/0370534 | A1 * | 12/2018 | Bemetz | B60W 10/02 |
| 2019/0111928 | A1 * | 4/2019 | Son | B60W 30/18063 |
| 2020/0101956 | A1 | 4/2020 | Suzuki et al. | |
| 2020/0355265 | A1 | 11/2020 | Elflein et al. | |
| 2020/0398844 | A1 * | 12/2020 | Ruybal | B60W 10/08 |
| 2022/0080942 | A1 | 3/2022 | Eberl et al. | |
| 2023/0271599 | A1 * | 8/2023 | Harrison | B60K 6/52 |
| | | | | 701/22 |

FOREIGN PATENT DOCUMENTS

| | | | | |
|---|---|---|---|---|
| DE | 10 2013 207 095 A1 | 10/2013 | | |
| DE | 10 2012 015 617 A1 | 2/2014 | | |
| DE | 102012223866 A1 * | 7/2014 | | B60L 15/2081 |
| DE | 10 2017 221 464 A1 | 5/2019 | | |
| DE | 102017222819 A1 * | 6/2019 | | B60W 30/18127 |
| DE | 10 2019 103 375 A1 | 8/2020 | | |
| EP | 0 822 128 B1 | 10/2001 | | |
| GB | 2599104 A | 3/2022 | | |
| WO | WO 2020/164831 A1 | 8/2020 | | |

OTHER PUBLICATIONS

Wang, Yuan; Yuan, Liangxin; Chen, Hao; Du, Peng; Lian, Xiaomin; A creep control for distributed rear wheel drive bus; 2020; Journal of Automobile Engineering (Year: 2020).*

International Search Report (PCT/ISA/210) issued in PCT Application No. PCT/EP2022/053185 dated May 13, 2022 with English translation (4 pages).

German-language Written Opinion (PCT/ISA/237) issued in PCT Application No. PCT/EP2022/053185 dated May 13, 2022 (6 pages).

German-language Search Report issued in German Application No. 10 2021 105 340.4 dated Sep. 10, 2021 with partial English translation (11 pages).

Chinese-language Office Action issued in Chinese Application No. 202280007644.6 dated Feb. 7, 2026, with English translation (17 pages).

* cited by examiner

DRIVE CONTROL SYSTEM FOR A MOTOR VEHICLE OPERABLE BY ELECTRIC MOTOR AND HAVING A GEAR SELECTOR

FIELD

The invention relates to a drive control system for a motor vehicle operable by electric motor and having a gear selector, having an electronic accelerator pedal, having a brake pedal and having an electronic control unit, which is connected to the gear selector, the accelerator pedal and the brake pedal.

BACKGROUND AND SUMMARY

The so-called "one-pedal feeling" with an electronic accelerator pedal in electric vehicles, which, more particularly, is a characteristic of the BMW i3, ensures that, once the accelerator pedal has been released, there is a strong, spontaneously controllable deceleration nearly to a standstill with high recuperation. Moreover, many different recuperation methods are already known for decelerating electrified motor vehicles (hybrid vehicles or purely electric vehicles).

DE 10 2017222819 A1 deals with a solution to the problem that the so-called "one-pedal feeling" is not perceived to be advantageous in all situations.

Moreover, the problem of brakes squeaking during creep is dealt with, for example, in EP 0 822 128 B1.

The problem addressed by the invention is that of further improving the comfort in electrified motor vehicles, more particularly, having a purely electric drive.

According to the invention, this problem is solved by the features as disclosed herein. Preferred enhanced embodiments of the invention are also described herein.

The invention relates to a drive control system for a motor vehicle operable by electric motor and having a gear selector, having an electronic accelerator pedal, having a brake pedal and having an electronic control unit, which is connected, more particularly electrically, to the gear selector, the accelerator pedal and the brake pedal in order to detect the actuation thereof and/or the actual position thereof in the conventional way via appropriate sensors. The control unit is designed, for example, by means of an appropriately programmed software module, such that a creep function is deactivated when a first alternative automatic gear (more particularly an automatic gear "B" or "i" or "e", which has a driving behavior that is characteristic for purely electric vehicles ("BEV")) is selected, and that a creep function is activated when a second alternative automatic gear (more particularly a typical drive automatic gear labeled "D" in the case of automatic transmissions) is selected.

In principle, creep is activated in gear "D." In the related art, however, creep has previously been carried out regardless of the braking intent of the driver.

According to the invention, the control unit therefore also includes an appropriately programmed function module, by means of which, when the creep function is activated, the creep torque predefined by a creep pilot control and in the form of a drive torque is reduced depending on a braking intent of the driver starting from the creep pilot control, wherein a frictional braking torque is applied by the conventional wheel brake system only when the minimum possible creep torque (for example, zero or the maximum possible recuperation torque) has been reached. The braking intent of the driver is detected, for example, in the usual way via the detected brake pressure at the brake pedal.

Preferably, the predefined creep torque is reduced depending on the braking intent of the driver and only within a defined lower velocity-frictional braking torque range. This velocity-frictional braking torque range is defined, more particularly, by empirically ascertaining that wheel-brake squeaking has arisen.

Preferably, the creep torque is reduced in proportion to the braking intent of the driver.

The creep torque predefined within the scope of the creep pilot control is preferably determined at least also depending on the vehicle velocity. This is the case because squeaking arises primarily at comparatively low vehicle velocities with low negative acceleration.

In one advantageous enhanced embodiment of the invention or also as an independent concept addressed by the invention, the gear selector has an automatically restoring toggle switch for selecting the first alternative automatic gear or the second alternative automatic gear, wherein every time the toggle switch is actuated counter to the direction of travel starting from one of the two alternative automatic gears, the other alternative automotive gear is selectable.

The invention also relates to an electronic control unit and at least one software function module for the electronic control unit of the drive control system according to the invention.

The invention is based on the following considerations:

In principle, acoustic problems also arise during creep with electrified motor vehicles having electric machine drive technologies due to brake squeaking during the application of the drive torque against the friction brake of the motor vehicle service brake.

In electrified drive concepts in which the internal combustion engine can be decoupled via clutches or which have purely electric drives, the creep pilot control is reduced according to the invention only as a function of the braking intent. The friction brake must then strike a balance between the friction braking component and the drive torque and is permitted to become active only when the creep drive torque is at least zero.

As a function of the braking intent of the driver, the drive torque is to be decreased in a controllable manner up to 0 [Nm]. Provided this takes place, the friction brake is not permitted to be active despite the braking intent of the driver and a balance is struck between the reduced creep torque and the braking intent of the driver. The friction brake is permitted to become active only when the drive torque has been completely reduced.

In vehicles that are driven by an internal combustion engine, deceleration likewise occurs when the accelerator pedal is released, although this is a noticeably lower deceleration than is the case with the aforementioned electric vehicles. During slow travel, this deceleration transitions into a so-called creeping speed, which enables travel at walking pace without the actuation of the accelerator pedal. Creep is helpful most particularly during maneuvering and parking.

One further objective of this invention is to connect the advantages of the driving modes of a vehicle having an internal combustion engine and an electric vehicle having a one-pedal feeling in a vehicle operable by electric motor by introducing an additional gear, referred to here as "B," as an alternative to the conventional "D" gear and which is selectable in automatic transmission vehicles, and to allow the driver to decide which driving mode is to be currently applied.

In this new gear ("B"), creep is essentially always deactivated and the recuperation level is high, preferably maximum or adaptive (more particularly in the presence of driver assistance systems having a route-ahead assistant), and is not freely selectable.

Exemplary embodiments of the invention are illustrated in the drawing and described in greater detail in the following.

DETAILED DESCRIPTION

Figure 1:
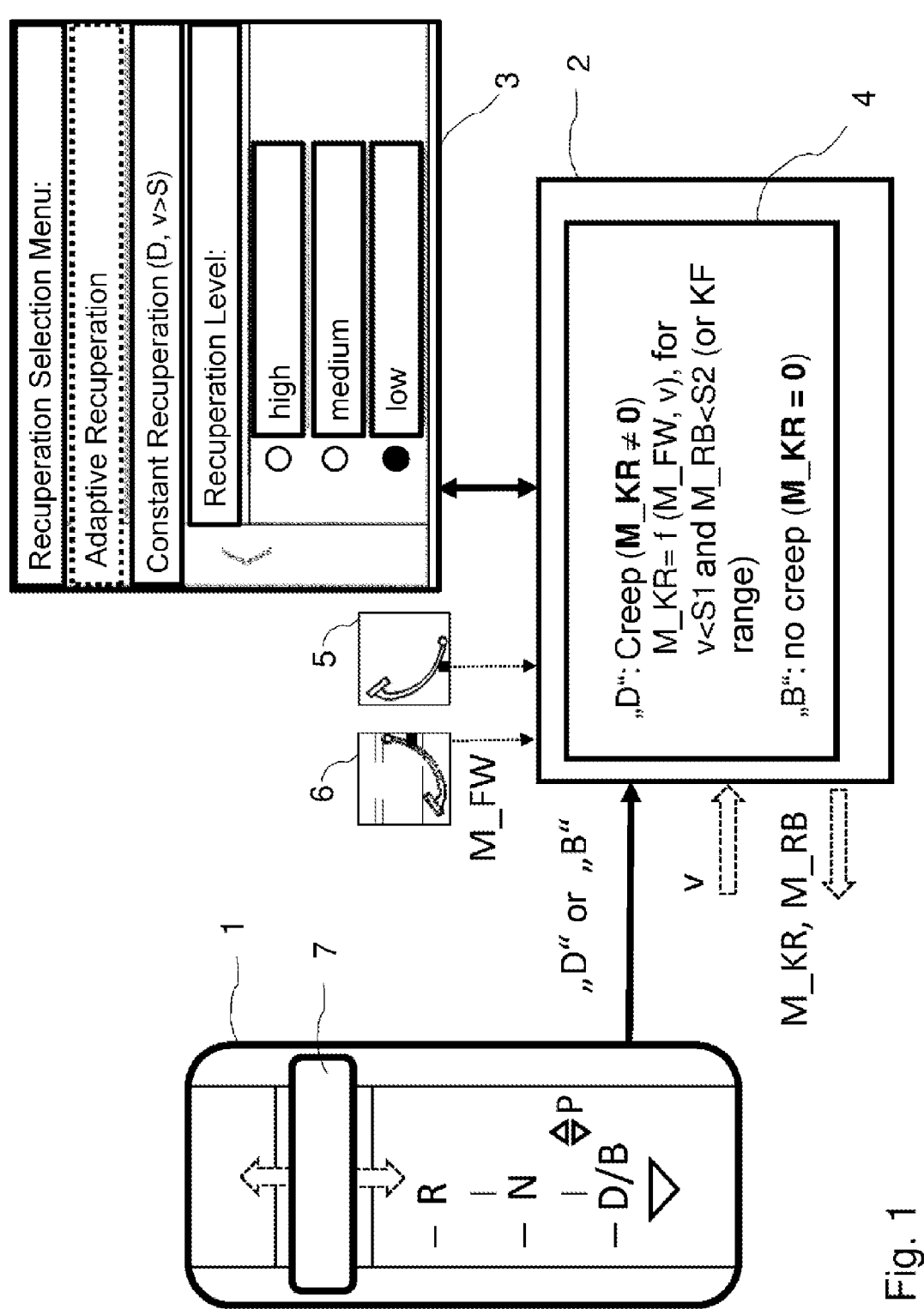
FIG. 1 shows an overview, in a schematic representation, of the essential components of the drive system according to the invention including selection of the two alternative automatic gears.

FIG. 1 shows a drive control system for a motor vehicle operable by electric motor, that includes an electronic control unit 2, which is electrically connected to a gear selector 1, to a display operating unit 3, to an accelerator pedal 5, and to a brake pedal 6. The gear selector 1 can include an actuating element 7 in the form of an automatically restoring toggle switch for selecting various gears R, N, D or B, wherein every time the toggle switch is actuated counter to the direction of travel starting from one of the two alternative automatic gears D and B, the particular other alternative automotive gear is selectable.

The electronic control unit 2 is designed, more particularly due to an appropriately programmed software module 4, such that, in principle, a comparatively high (preferably maximum) recuperation level is set and creep is deactivated when a first alternative automatic gear ("B") is selected and the accelerator pedal is released, and that at least one selectable fixed recuperation level or a (more particularly auto-adaptive) sailing operation is predefinable and creep is activated when a second alternative automatic gear ("D") is selected and the accelerator pedal is released.

For implementing recuperation in the gear "D," the recuperation level can preferably be configured by the driver, for example, via a display operating unit 3. The driver can choose, for example, between an "adaptive recuperation" or a preferred, fixedly settable recuperation level (in this case, for example, high/medium/low). With adaptive recuperation (via camera, radar, and navigation data), the vehicle automatically selects the correct recuperation as a function of the traffic situation.

The control unit 2 including the software module 4 is also designed according to the invention such that a creep function is activated when the second alternative automatic gear "D" is selected, in which the creep torque M_KR predefined by a creep pilot control M_KR_vor and in the form of a drive torque is reduced depending on a braking intent M_FW of the driver starting from the creep pilot control M_KR_vor, wherein a frictional braking torque M_RB is applied only when the minimum possible creep torque has been reached.

Figure 2:
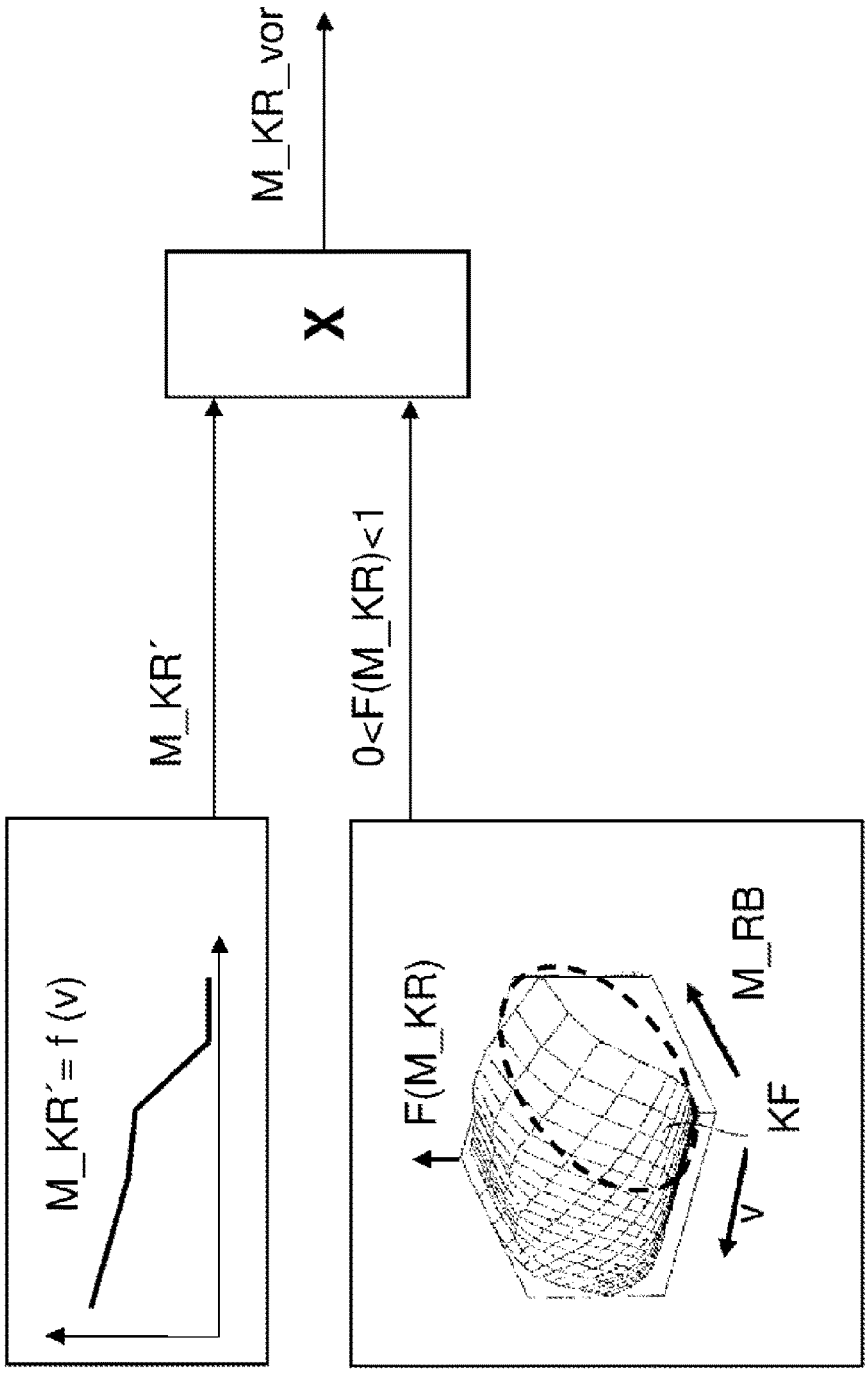
FIG. 2 shows an overview, in a schematic representation, of creep pilot control for the creep function according to the invention.

One possible method for determining the creep pilot control M_KR_vor is represented in FIG. 2. The creep torque M_KR predefined by the creep pilot control M_KR_vor is preferably determined depending on the vehicle velocity v. For this purpose, a raw creep torque M_KR' depending on the vehicle velocity v is multiplied by a factor F between 0 and 1. The factor F is read out from a characteristic map, which specifies a value between 0 and 1 depending on the vehicle velocity v and the frictional brake torque M_RB.

Figure 3:
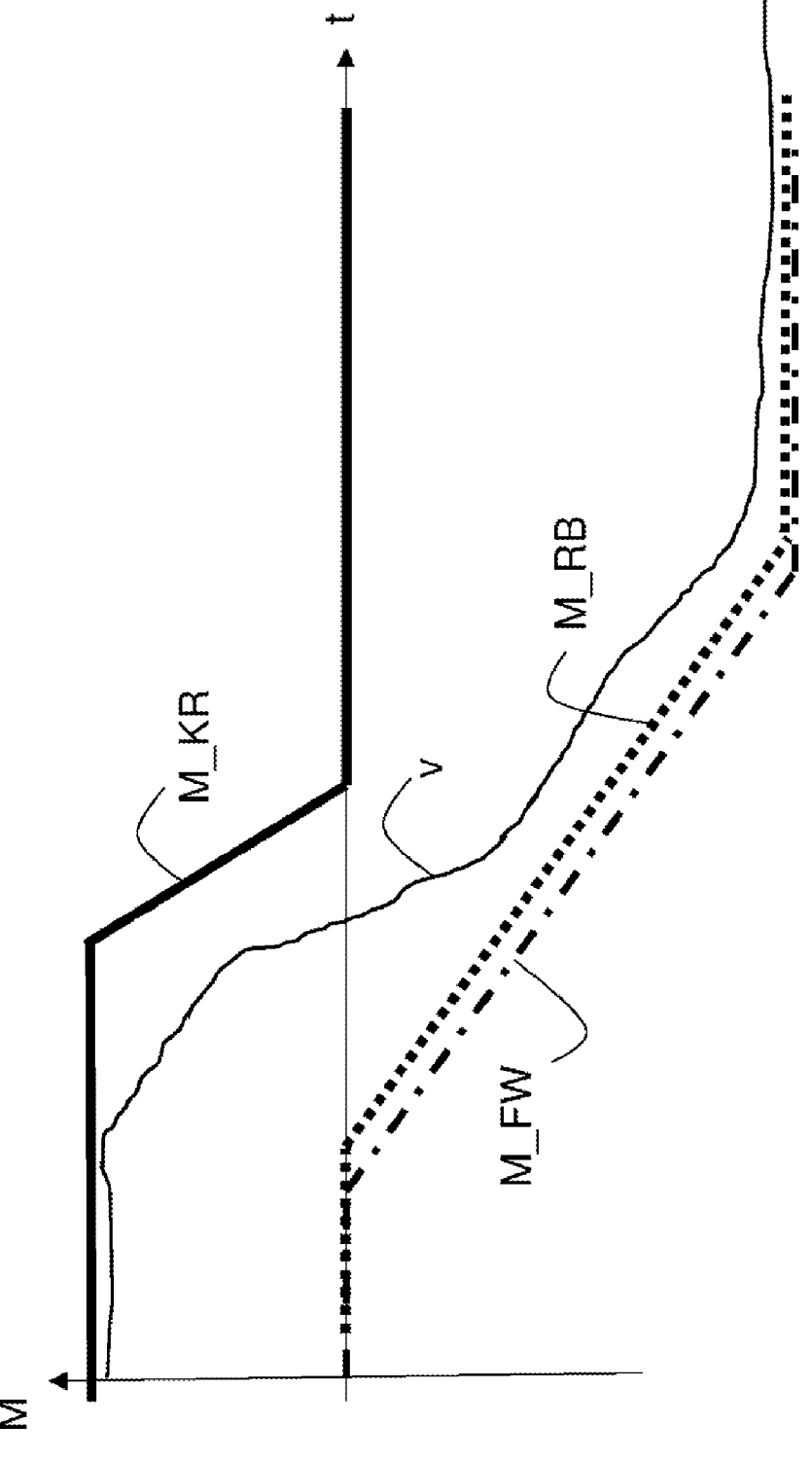
FIG. 3 shows a diagram-type explanation of a creep function according to the related art.

FIG. 3 shows the effect of a creep function according to the related art. In principle, creep is activated in gear "D." In the related art, however, the creep torque M_KR is implemented regardless of the braking intent M_FW of the driver. The braking intent M_FW is attended to solely by means of the frictional braking torque M_RB of the service brake. This results in an unsteady deceleration curve of the vehicle velocity v and, as a result, in brake squeaking for particularly low values of the vehicle velocity or deceleration. According to the invention, the friction brake is therefore intended to be used as little as possible.

Figure 4:
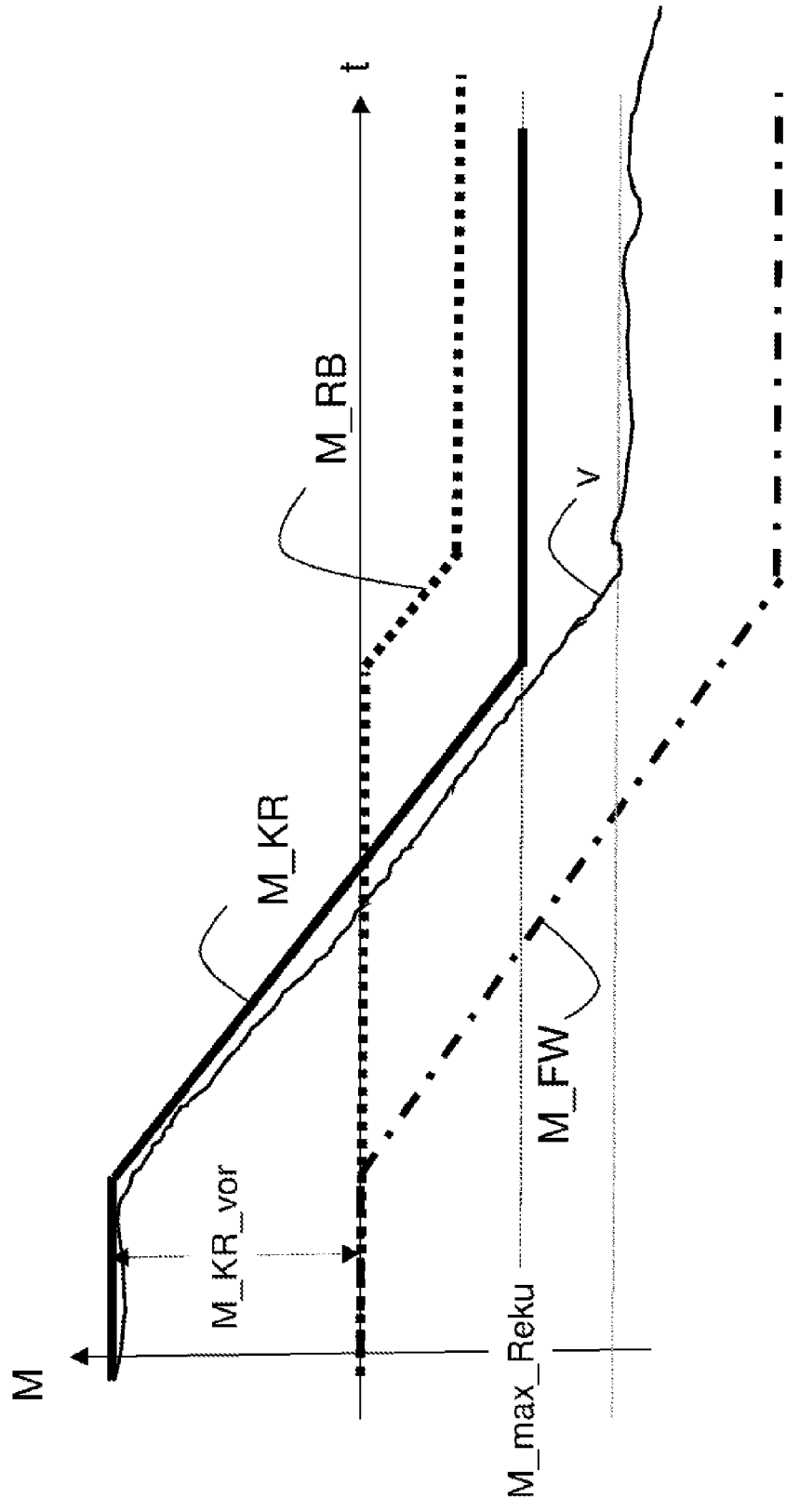
FIG. 4 shows a diagram-type explanation of a creep function according to the invention.

FIG. 4 shows the creep function according to the invention in greater detail with reference to an exemplary embodiment:

When the creep function is activated, the creep torque M_KR predefined by the creep precontrol M_KR_vor is reduced depending on the braking intent M_FW of the driver starting from the creep precontrol M_KR_vor and preferably only within a defined lower velocity-frictional braking torque range KF. This lower velocity-frictional braking torque range KF is schematically plotted in FIG. 2 as a range KF, which is particularly relevant for the squeaking problem. The range KF defines that the vehicle velocity v is to be lower than a first threshold value S1 and the frictional braking torque M_RB is to be lower than a second threshold value S2.

FIG. 4 also shows that the creep torque M_KR is reduced in proportion to the braking intent M_FW of the driver until, preferably, the minimum possible creep torque has been reached, which is the currently maximum possible recuperation torque M_max_Reku in this case.

The invention claimed is:

1. A drive control system for a motor vehicle operable by electric motor comprising:

a gear selector;

an electronic accelerator pedal;

a brake pedal; and an electronic control unit, which is connected to the gear selector, the accelerator pedal, and the brake pedal, wherein the electronic control unit is configured to:

deactivate a creep function in response to a first alternative automatic gear being selected; and activate a creep function in response to a second alternative automatic gear being selected, wherein a creep torque predefined by a creep pilot control and in the form of a drive torque is reducible depending on a braking intent of the driver starting from the creep pilot control, and wherein a frictional braking torque is applied only when a minimum possible creep torque applied by the electric motor has been reached, and wherein the minimum possible creep torque is the current maximum possible recuperation torque by the electric motor.

2. The drive control system according to claim 1, wherein when the creep function is activated, the creep torque predefined by a creep precontrol is reduced depending on the braking intent of the driver starting from the creep precontrol and only within a defined lower velocity-frictional braking torque range.

3. The drive control system according to claim 1, wherein the creep torque is reduced in proportion to the braking intent of the driver.

4. The drive control system according to claim 1, wherein the minimum possible creep torque is zero.

5. The drive control system according to claim 1, wherein the creep torque predefined by the creep pilot control is determined depending on a vehicle velocity.

6. The drive control system according to claim 1,
wherein the gear selector has an automatically restoring toggle switch for selecting the first alternative automatic gear or the second alternative automatic gear, and
wherein every time the toggle switch is actuated counter to the direction of travel starting from one of the two alternative automatic gears, the particular other alternative automotive gear is selectable.

7. An electronic control unit for a drive control system of a motor vehicle operable by electric motor, wherein the electronic control unit is configured to:
deactivate a creep function of the motor vehicle in response to a first alternative automatic gear being selected; and
activate a creep function in response to a second alternative automatic gear being selected, wherein a creep torque predefined by a creep pilot control and in the form of a drive torque is reducible depending on a braking intent of a driver starting from the creep pilot control, and
wherein a frictional braking torque is applied only when a minimum possible creep torque applied by the electric motor has been reached, and
wherein the minimum possible creep torque is the current maximum possible recuperation torque by the electric motor.

8. The electronic control unit according to claim 7, wherein when the creep function is activated, the creep torque predefined by a creep precontrol is reduced depending on the braking intent of the driver starting from the creep precontrol and only within a defined lower velocity-frictional braking torque range.

9. The electronic control unit according to claim 7, wherein the creep torque is reduced in proportion to the braking intent of the driver.

10. The electronic control unit according to claim 7, wherein the minimum possible creep torque is zero.

11. The electronic control unit according to claim 7, wherein the creep torque predefined by the creep pilot control is determined depending on a vehicle velocity.

* * * * *